United States Patent [19]

Koenig

[11] Patent Number: 4,590,470

[45] Date of Patent: May 20, 1986

[54] USER AUTHENTICATION SYSTEM EMPLOYING ENCRYPTION FUNCTIONS

[75] Inventor: Andrew R. Koenig, Elizabeth, N.J.

[73] Assignee: AT&T Bell Laboratories, Murray Hill, N.J.

[21] Appl. No.: 512,887

[22] Filed: Jul. 11, 1983

[51] Int. Cl.[4] .......................... H04Q 9/00; H04L 9/00; G06K 5/00

[52] U.S. Cl. ............................. 340/825.31; 178/22.08; 235/379

[58] Field of Search ............ 340/825.3, 825.31, 825.34; 178/22.08; 375/2.1; 235/379, 380

[56] References Cited

U.S. PATENT DOCUMENTS

| | | | |
|---|---|---|---|
| 3,806,874 | 4/1974 | Ehrat | 178/22.08 |
| 4,105,156 | 8/1978 | Dethloff | 235/441 |
| 4,281,215 | 7/1981 | Atalla | 178/22.08 |
| 4,297,569 | 10/1981 | Flies | 235/443 |
| 4,349,695 | 9/1982 | Morgan et al. | 178/22.08 |
| 4,438,824 | 3/1984 | Mueller-Schloer | 178/22.08 |
| 4,467,139 | 8/1984 | Mollier | 178/22.08 |

OTHER PUBLICATIONS

"Data-Encryption 'Box' Secures Comm Systems Easily", K. Cohen et al., Electronics Design, Apr. 16, 1981, vol. 29, No. 8, pp. 159-163.
Conference Record of Eascon, 1982 "Personal Authentication System for Access Control to the Defense Data Network," S. T. Kent, et al., pp. 89-93.
Communications of the ACM, vol. 24, No. 11, Nov., 1981 "Password Authentication with Insecure Communication," L. Lamport, pp. 770-772.

Primary Examiner—Donald J. Yusko
Attorney, Agent, or Firm—Henry T. Brendzel

[57] ABSTRACT

A system which employs a pair of encryption functions f and g in the "log on" protocol of a computer dial-up arrangement. The functions are inverses of each other and, hence, a random sequence when encrypted with f and then with g results in the original sequence. When a user wishes to "log on", the computer selects a random sequence and forms a challenge sequence. The user encrypts the challenge sequence with the function g and thus forms a response sequence. Encryption with the function f by the computer permits verification of the response sequence.

The secrecy of the user's function is maintained by providing the user with an authenticating device having only two ports: a power port and an I/O port. The I/O port is connected to a microprocessor which accesses a memory that contains the secret encryption function g.

5 Claims, 4 Drawing Figures

USER AUTHENTICATION SYSTEM EMPLOYING ENCRYPTION FUNCTIONS

TECHNICAL FIELD

This invention relates to authentication systems that protect against unauthorized access to a facility, such as a building or a host computer.

BACKGROUND OF THE INVENTION

The use of computers has matured to the point where they are often relied upon to store and process sensitive information. Even banking functions such as fund transfers and dispensing of cash are now often controlled with computers. Naturally, such computers are attractive targets to interlopers wishing to gain unauthorized entry; particularly in systems that interact with users directly.

To provide for the needed security, computer systems that permit electronic "dial-up" access generally control the access by identifying each authorized user with a secret password which is communicated to the computer during the initial protocol between the user and the computer system. The password is most commonly sent through a typewriter-like terminal, through a key pad similar to that of a touch-tone telephone, or through a credit card-like device that contains an electronically readable magnetic strip.

Unfortunately, these means for user authentication are often not very effective against a sophisticated interloper.

One way in which a password's integrity can be compromised is by gaining access to the password file within the host computer. This can occur, for example, by corrupting the computer operator. However, this is the most risky approach for an interloper and is, therefore, generally not a problem. Also, access to the password file can be made quite difficult by encrypting the file.

A second way in which a password's integrity can be compromised is by intercepting the user's communication with the computer. This can be done by wiretapping and eavesdropping of the protocol between the user and the computer and recording the password as it is transmitted. Alternatively, the computer's "log on" protocol can be mimiced, thereby tricking the user into divulging the password.

A third, and the most common way, in which a password's integrity is lost is through misuse of the password by the user. Computer users tend to be careless by selecting passwords that are relatively easy to guess. Sometimes users lend their passwords to others and forget to change them. Even having the computer system select the passwords does not solve the problem, because the resulting passwords are often so obscure that users tend to write them down and keep them in physical proximity to the teminals. Of course, that makes unauthorized access even easier.

Various systems are found in the art for reducing the risk of password exposure.

W. P. Flies, in U.S. Pat. No. 4,297,569 issued Oct. 27, 1981 describes a key-like device that is small enough to be carried on the person of the user. That device, carrying microelectronic memory circuits is adapted to be inserted or otherwise connected to a computer and to make its data available to the system. This data forms the secret password, which can be as complex as the memory circuits permit.

The disadvantage of the Flies key-like device, paralleling the problem of conventional door keys, lies in the fact that a possessor of the key can copy the information it carries. Also, the Flies device does not circumvent the wiretapping problem.

A similar concept is described by J. Dethloff in U.S. Pat. No. 4,105,156 issued Aug. 8, 1978, where the key-like device is shown in the form of a credit card. Rather than mere memory circuits, the Dethloff device contains a microprocessing unit, a memory unit for controlling the microprocessor and a separate memory for storing the password. The desired password is entered into the separate memory once, and the path to that memory is burned to permanently prevent reading or altering the password memory through the port by which the password was entered. The card communicates with the host computer only through its I/O port which is connected to the microprocessor. The Dethloff device divulges its password only when the correct query sequence is presented at its I/O port, but such a query can be designed to be so complex as to make the password practically unattainable by a possessor of the card.

The Dethloff device remedies the main drawback of the Flies device, but it is still subject to compromise through eavesdropping and/or protocol mimicing.

S. T. Kent, et al., in an article entitled "Personal Authentication System for Access Control to the Defense Data Network," Conference Record of Eascon, pp. 89–93, describe a system aimed to prevent the compromise of passwords through wiretapping. They suggest a challenge-response scheme where the computer system issues a challenge to the user, who must generate a response that is some function of the challenge. For example, a user may be required to transform a random numeric challenge into a response based on knowledge of some secret parameter and an algorithm (which may or may not be secret). The system has available both the secret parameter and the algorithm, so it can perform the calculation to verify the response submitted by the user.

The Kent, et al., proposal suggests the use of both a memorized password and an authenticating device. The authenticating device is an encryption key, either recorded on a magnetic-type card or stored in an inexpensive device containing the Data Encryption Standard (DES) algorithm adopted by the U.S. Bureau of Standards.

The problem with the Kent, et al., system is that a possessor of the authenticating device containing the encryption key can duplicate the key, resulting in the memorized password being the sole barrier to unauthorized access.

In an article entitled "Password Authentication with Insecure Communication," Communications of the ACM, November, 1981, Vol. 24, No. 11, pp. 770–772, L. Lamport suggests the use of encryption functions as the challenge-response pairs. Lamport suggests that the host computer choose a sequence of passwords $x_1, x_2, \ldots, x_{1000}$, where $x_i$ is the password by which the user identifies himself for the $i^{th}$ time. The system must know the sequence $y_1, y_2, \ldots, y_{1000}$, where $y_i = F(x_i)$ and the $y_i$ are distinct to prevent an intruder from reusing a prior password. The function F is a one-way mapping function which encrypts the password x and is such that each user password is the value needed by the system to authenticate the next password.

The Lamport system is quite powerful because each communication between the user and the host computer is unique and the function F, which is employed to authenticate the password, cannot be deciphered. The drawback of the Lamport system, however, is that the set of passwords is fixed apriori and is finite. That means that after a fixed number of communications the user must be given a new set of password functions.

SUMMARY OF THE INVENTION

It is the object of this invention to provide a user authentication system that safeguards against an unauthorized access. It is a further object of this invention to provide a system that protects passwords from compromise by copying through temporary authorized access to the password. It is a still further object of this invention to provide a system that protects passwords from compromise to wiretapping interlopers who record transmitted passwords or who mimic computer protocol.

These and other objects and advantages are realized in accordance with the principles of my invention by a system which employs a pair of encryption functions and a random message in the "log on" protocol. The functions, f and g, are such that a sequence encrypted with f and then with g results in the original sequence. When a user wishes to "log on", the computer selects an essentially random sequence A and forms the challenge sequence by encrypting A with the function f. The user encrypts f(A) with the function g and thus forms the response sequence. The secrecy of the user's function is maintained by providing the user with an authenticating device having ony two ports: a power port (battery and ground) and an I/O port. The I/O port is connected to a microprocessor which has access to a memory that contains the secret encryption function.

DETAILED DESCRIPTION

In 1976 Diffie and Hellman introduced the revolutionary concept of public-key encryption. Unlike the classical cryptosystems, in a public-key cryptosystem the encryption and the decryption keys are different. Moreover, given just one of the two keys, it is essentially impossible to calculate the other key, although it is simple to create a matched pair of keys in the first place. Thus, a pair of functions, f and g, can easily be created such that a plaintext message m, when encrypted with f to form f(m), can be decrypted with g.

A number of ways are known in the art for generating the functions f and g. Rivest, Shamir and Adelman, for example, have described one method which is based on the fact that it is easy to generate two large prime numbers and multiply them together, but it is computationally prohibitive to factor the resulting product. This method, which is described in an article titled "A Method for Obtaining Digital Signatures and Public-Key Cryptosystems," Communications of the ACM, Vol. 21, pp. 120-126, February 1978, can be summarized in the following steps:

1. select prime numbers, p and q;
2. compute $n=(p)(q)$ and $k=(p-1)(q-1)$;
3. select a random number, f, relatively prime to k;
4. compute g such that $(f)(g)=1 \bmod k$;
5. develop encrypted message, x, from plaintext message, m (an integer between 1 and $k-1$), by calculating $m^f \bmod n$;
6. decrypt message m by calculating $x^g \bmod k$.

Another algorithm for obtaining the functions f and g is presented by D. E. Knuth in "The Art of Computer Programming," Vol. 2, "Seminumerical Algorithms," pp. 386-394 published by Addison-Wesley Publishing Co. in 1981.

Figure 1:
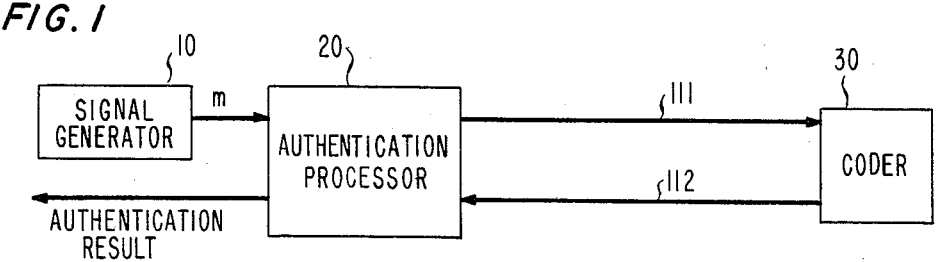
FIG. 1 presents a block diagram of the authentication system of my invention.

The system of FIG. 1 employs the public-key two function concept, and enhances it by employing an essentially random message m in the authentication protocol. By "essentially" random I mean that the message is randomly selected from the domain of the encryption function f.

More specifically with regard to the FIG. 1 system, a user wishing to gain access signals the authentication equipment (elements 10 and 20 in FIG. 1) and that equipment initiates the authentication protocol. Generator 10 selects an essentially random sequence as the challenge message m, element 20 challenges the user via line 111, the user operates on the signal of line 111 within coder 30 and responds on line 112, and element 20 evaluates the user's response.

Figure 2:
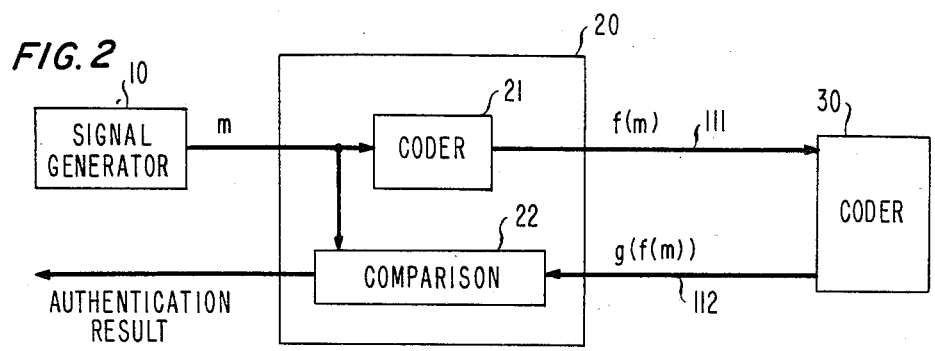
FIGS. 2 and 3 present diagrams of the system of FIG. 1 that depict two specific realizations for element 20 in FIG. 1.
Figure 3:
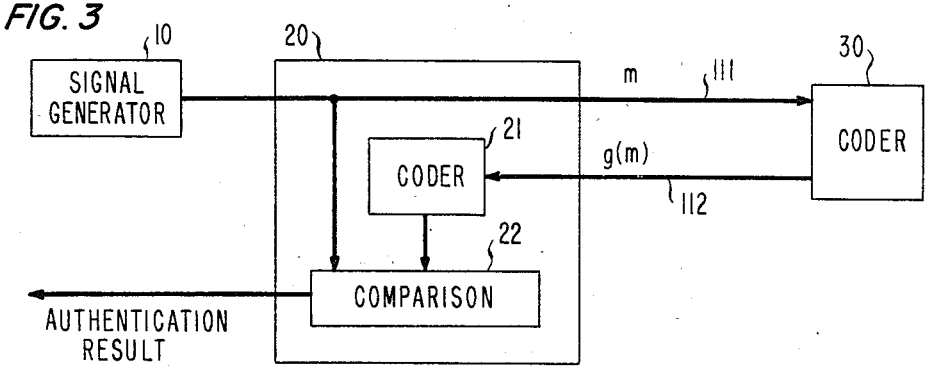

FIGS. 2 and 3 present two essentially equivalent embodiments of the authentication system of FIG. 1, depicting different realizations for element 20 in more detail. In FIG. 2, coder 21 encrypts the plaintext message m and sends the encrypted message f(m) to coder 30 via line 111. Coder 30 decrypts the message and sends the decrypted message g(f(m)) back to element 20. Element 22 compares the decrypted message to the original message and since f and g are inverses of each other, g(f(m)) equals m, and element 22 is satisfied.

In the FIG. 3 system, the message m is sent to line 111 unaltered, the user encrypts the message in coder 30 and sends the encrypted message g(m) over line 112. Coder 21 decrypts g(m) with the function f, developing f(g(m)), and element 22 compares f(g(m)) to m. Again, since g and f are inverses of each other, f(g(m)) equals m and element 22 indicates that access should be granted.

Realization of the elements depicted in FIGS. 2 and 3 can be attained with conventional hardware. Generator 10, for example, is realized with an A/D converter having thermal noise at its input. The random sequence of 1's and 0's out of the converter is loaded into a modulo n register and the output of the register is sent to element 20.

Comparison element 22 is a conventional comparison device comprising Exclusive OR and AND gates.

Coder elements 21 and 30 perform essentially the same function (encryption with f and g, respectively) and can therefore be implemented similarly. With the Rivest, Shamir and Adelman (RSA) method, the encryption requires raising an incoming numerical sequence to a predetermined power in predetermined modulo arithmetic. This is achieved through a multiplication and division process as described in the aforementioned Rivest, et al., article (Sec. VII-A) in a simple microprocessor under control of a stored algorithm.

The system of FIG. 1 is quite robust because it employs four parameters in the authentication protocol:

the functions f and g, the modulos n (in the RSA method), and the essentially random message m. Because of the randomness in message m, even wiretapping and recording of a valid protocol sequence can be of no help in responding at a subsequent protocol.

Figure 4:
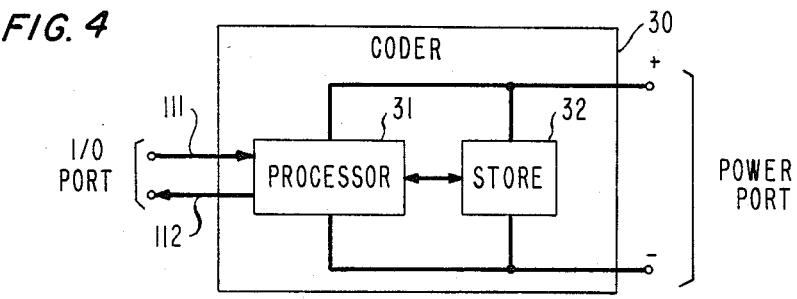
FIG. 4 illustrates the two port realization for coder 30.

It should be noted that the FIG. 1 authentication system requires the user to possess local computing power, embodied in coder 30. Although such computing power removes the need for people to remember or write down their passwords, the existence of local computing power might make it possible to steal someone's password (the function g and the modulos n) by examining the memory within coder 30. This is avoided, in accordance with the principles of my invention, by implementing coder 30 in a portable device, such as a card or a key, and by arranging the device to have only two accessible ports: a power and ground port, and an I/O port. As shown in FIG. 4, such a device needs to contain only a microprocessor or some other computing device, e.g., procesor 31, which communicates with lines 111 and 112 via the I/O port, and a memory device 32 for storing the algorithm and the selected parameters, which communicates only with processor 31. The power port merely supplys the necessary power to coder 30 and cannot divulge any information.

What is claimed is:

1. A communication system employing a two-way communication link (111 and 112), first means (10 and 20) connected to said link for initiating an authentication protocol and second means (30) connected to said link for responding to initiated authentication protocol, characterized in that:

said communication system employs a public key encryption approach characterized by a pair of encryption functions, one being a public key and the other being a private key; and said first means comprises: a generator (10) for initiating a protocol by developing an essentially random authentication message, third means for sending a challenge signal over said link to said second means, and fourth means for comparing said authentication message with a response signal sent by said second means.

2. The system of claim 1 wherein said generator (10) develops an essentially random authentication message;

said third means comprises a coder (21) responsive to said generator for encrypting said authentication message with one encryption function of said pair of encryption functions to develop said challenge signal, and for applying said challenge signal to said comunication link;

said second means enciphers said challenge signal with the other encryption function of said pair of encryption functions to develop response signal; and said fourth means comprises comparison means (22) for comparing said authentication message to said response signal sent by said second means.

3. The system of claim 1 wherein said generator (10) develops an essentially random authentication message and applies said message to said communication link as said challenge signal;

said second means enciphers said challenge signals with one encryption formation of said pair of encryption functions; and said third means comprises a coder (21) responsive to said response signal for encrypting said response signal with the other encryption function of said pair of encryption functions to develop a decrypted response signal, and comparison means (22) for comparing said authentication message to said decrypted response signal.

4. The system of claim 1 wherein said second means develops said response signal by encrypting said authentication message with an encryption function g and said first means includes coding means (21) for encrypting signals with an encryption function f that is the inverse function of g.

5. An authentication system comprising:

first means for generating essentially random signal sequences (10);

a two-way communication link (111 and 112);

second means (30) for receiving signals from said communications link, coding said received signals with a private key to develop encrypted signals and applying said encrypted signals to said communication link; and third means (20) for controlling communications between said first means and said second means, for coding said encrypted signals with a public key to develop deciphered signals and for comparing said deciphered signals to said signal sequences.

* * * * *